United States Patent [19]

Udipi

[11] 4,131,725

[45] Dec. 26, 1978

[54] POLYMER EPOXIDATION PROCESS

[75] Inventor: Kishore Udipi, Bartlesville, Okla.

[73] Assignee: Phillips Petroleum Company, Bartlesville, Okla.

[21] Appl. No.: 822,780

[22] Filed: Aug. 8, 1977

[51] Int. Cl.$^2$ ............................................... C08F 8/08
[52] U.S. Cl. ........................................ 526/56; 526/57
[58] Field of Search .......................................... 526/56

[56] References Cited

U.S. PATENT DOCUMENTS

| | | | |
|---|---|---|---|
| 3,740,414 | 6/1973 | Olson | 526/56 |
| 3,842,010 | 10/1974 | Puppas et al. | 526/56 |
| 3,975,332 | 8/1976 | Anderson | 526/56 |
| 4,051,199 | 9/1977 | Udipi et al. | 526/56 |

Primary Examiner—William F. Hamrock

[57] ABSTRACT

An improved process for the production of epoxidized rubbery polymers substantially free of gel which comprises carrying out the epoxidation in an aliphatic or alicyclic hydrocarbon diluent with hydrogen peroxide and a mixture of formic acid and at least one other low molecular weight monocarboxylic acid.

9 Claims, No Drawings

POLYMER EPOXIDATION PROCESS

This invention relates to the production of epoxidized rubbery polymers. In accordance with another aspect, this invention relates to an improved process for the production of substantially gel-free epoxidized rubbery polymers comprising carrying out the epoxidation reaction in an aliphatic or alicyclic hydrocarbon diluent and a mixture of monocarboxylic acids. In accordance with a further aspect, this invention relates to the epoxidation of diene polymers in an aliphatic solvent using hydrogen peroxide and a mixture of formic acid and at least one other low molecular weight monocarboxylic acid. In accordance with a still further aspect, a portion of the formic acid ordinarily used during the epoxidation of rubbery polymers is replaced with a higher molecular weight monocarboxylic acid to eliminate the formation of gel during epoxidation.

While thermoplastic elastomers have unique properties insofar as their exhibition of the properties of a vulcanized rubber without actually being subjected to vulcanization, they have certain physical properties that it would be desirable to improve. Furthermore, it is often desirable to modify elastomeric polymers to broaden their field of application. For example, the hydrocarbon sensitivity of thermoplastic polymers prevents or greatly limits their utility in applications where contact with oil or oil-based solutions is required. Moreover, it is often desirable to provide elastomers with polar character so as to increase their hydrophilicity or to improve their compatibility with other polar components. In addition, it is often desirable to further derivatize or to react diene polymers with other substrates, compounds, or polymers.

An often preferred method of modifying the properties of diene polymers in order to broaden their applications is by epoxidation of the residual unsaturation inherent in polymers of conjugated dienes.

This invention relates to a method of introducing polar groups onto the backbone of unsaturated elastomers. In particular, it relates to a method of introducing hydroxy, acyloxy, and epoxide groups onto the backbone of rubbery polymers. More particularly, it relates to adding said functional groups onto polymers of conjugated dienes by an epoxidation process in which the undesirable formation of gel particles, which often accompanies said epoxidation process, is minimized by the use of a specific combination of epoxidation reagents and diluents.

Accordingly, it is an object of this invention to provide an improved process for the epoxidation of rubbery polymers.

Another object of this invention is to provide a process for producing substantially gel-free epoxidized rubbery polymers.

Another object of this invention is to provide a convenient and commercially feasible process for the production of substantially gel-free epoxidized rubbery polymers.

Other objects, aspects, and the several advantages of the invention will be apparent to those skilled in the art upon a study of this disclosure and the appended claims.

In accordance with the invention, substantially gel-free epoxidized polymers are produced in a process comprising contacting (a) a rubbery polymer of a conjugated diene in (b) an aliphatic or alicyclic hydrocarbon diluent with (c) hydrogen peroxide and (d) a mixture of low molecular weight monocarboxylic acids.

In a preferred embodiment of the invention, the epoxidation of rubbery polymers is carried out with a mixture of formic acid and at least one other low molecular weight monocarboxylic acid to produce a substantially gel-free epoxidized rubbery polymer of a conjugated diene.

More specifically, in the epoxidation of conjugated diene polymers in aliphatic solvents using a mixture of formic acid and hydrogen peroxide, it has been found that substitution of part of the formic acid with a higher molecular weight monocarboxylic acid will eliminate gel formation and an epoxidized polymer substantially free of gel can be produced.

Rubbers which can be used in this invention include liquid, semi-liquid, and solid homo- and copolymers of conjugated dienes in which the monomer addition can be in the 1,2 mode or the 1,4 mode or combinations thereof. More particularly, the polymers to be modified according to this invention include the homopolymers of conjugated dienes, and the copolymers of conjugated dienes and monovinylarene monomers. Generally, the polymers have a number average molecular weight of about 5,000 to about 400,000, or higher, preferably about 50,000 to about 200,000.

The rubbery copolymers useful in this invention generally include random, graft, block, linear teleblock, and radial teleblock copolymers, including those containing random and tapered block segments, and mixtures thereof, said polymers having a conjugated diene/monovinylarene weight ratio of 35/65 to 95/5. A more preferable range of conjugated diene/monovinylarene weight ratios is from 45/55 to about 90/10.

The conjugated dienes which can be used for the preparation of the rubbery polymers of this invention are those containing from about 4 to 12 carbon atoms per molecule, more preferably from 4 to 8 carbon atoms per molecule. Examples of such monomers are 1,3-butadiene, chloroprene, isoprene, 2,3-dimethyl-1,3-butadiene, piperylene, 3-butyl-1,3-octadiene, 2-phenyl-1,3-butadiene, and the like, and mixtures thereof. Especially preferred are 1,3-butadiene and isoprene due to their availability and favorable cost.

The monovinylarene monomers normally contain from about 8 to about 20 carbon atoms per molecule and can contain alkyl, cycloalkyl, and aryl substituents, and combinations thereof such as alkylaryl, in which the total number of carbon atoms in the combined substituents is generally not greater than 12. Examples of monovinylarene monomers include styrene, $\alpha$-methylstyrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, and the like. Styrene is presently preferred because of its availability and effectiveness.

The rubbery polymers of this invention can be prepared according to the methods described in the art. General methods described in U.S. Pat. Nos. 2,975,160; 3,265,765; and 3,280,084 are especially applicable. Polymerizations can be hydrocarbyl alkali metal initiated, or alternately free radical initiated. Furthermore, these polymerizations can be solution, suspension, or emulsion processes, and can be conducted as a batch process, as a continuous process, or combinations thereof.

The epoxidation process is conducted in such a way so as to substantially eliminate the possibility of epoxidizing any monovinylarene portions of the polymer if present, but under conditions that the extent of epoxidation, as defined by the ratio of olefinic double bonds modified by the epoxidation reaction to the number of initial olefinic double bonds, varies from about 5 to about 80 percent, preferably from about 15 to about 60 percent.

Epoxidation of rubbery polymers is generally effected by known methods such as by reaction with organic peracids which can be preformed or formed in situ during the reaction. Preformed acids typically used include such as peracetic acid and perbenzoic acids, while in situ formation is exemplified by the use of hydrogen peroxide in the presence of formic acid, or hydrogen peroxide in the presence of a low molecular weight monocarboxylic acid (or acid anhydride) such as acetic acid and a strong acid catalyst. Suitable strong acid catalysts include sulfuric acid, p-toluenesulfonic acid, phosphoric acid, and the like, or alternately a cationic exchange resin.

During epoxidation a number of intermolecular reactions can occur in addition to or subsequent to the preferred formation of epoxide groups. These undesirable side reactions, which often lead to crosslinking or gelation of the reaction mass, are particularly noticeable with the in situ performic acid process using an alicyclic or aliphatic hydrocarbon diluent. In contrast, the gelation problem is generally not observed when an aromatic diluent is employed, or when the epoxidizing agent is derived from acetic acid. Although these two alternatives can quite satisfactorily eliminate the gel problem, they do impose serious limitations on the epoxidation process. For example, it is often expedient and desirable to conduct the epoxidation in an alicyclic or aliphatic solvent, e.g., conducting the epoxidation directly on the polymerization cement (polymer solution as formed), the polymerization diluent frequently being an alicyclic or aliphatic hydrocarbon. Furthermore, the necessity of a strong acid catalyst for the in situ formation of peracetic acid not only poses an added expense but also can lead to equipment corrosion, and in the case in which the catalyst is a cationic exchange resin, a removal of separation step is required.

It has been found that these limitations and deficiencies can now be circumvented by the use of a mixture of formic acid and acetic acid or other low molecular weight monocarboxylic acid for the in situ peracid formation. Not only can the epoxidation be conducted gel-free in an alicyclic or aliphatic hydrocarbon diluent, but the presence of the strong acid catalysts typically used with acetic acid are not required. This is accomplished without sacrificing the level of epoxidation attainable using formic acid alone. The molar ratio of formic acid to monocarboxylic acid is broadly in the range of about 3:2 to about 1:10, more preferably from about 3:2 to about 1:2.

The aliphatic or alicyclic hydrocarbons suitable as diluents for the epoxidation process are capable of dissolving the elastomer in its initial state as well as after being partially epoxidized and generally have boiling points in the range of about 35° C. to about 150° C., more preferably from about 60° C. to about 100° C. Examples of suitable diluents include pentane, cyclopentane, hexane, 2-methylpentane, 2,2-dimethylbutane, 2,3-dimethylbutane, methylcyclopentane, cyclohexane, 2,4-dimethylpentane, 2,3-dimethylpentane, methylcyclohexane, heptane, and the like, and mixtures thereof.

The low molecular weight monocarboxylic acids which are suitable include in addition to the preferred acetic acid those acids which are normally liquid at room temperature and which generally have 2 to 9 carbon atoms per molecule. Exemplary acids include chloroacetic acid, trifluoroacetic acids, propionic acid, isobutyric acid, n-valeric acid, caproic acid, caprylic acid, and the like, as well as mixtures thereof.

The hydrogen peroxide solution used preferably contains about 30 percent or higher hydrogen peroxide. The amount of hydrogen peroxide used is preferably between about 1 and about 2 moles per mole of olefinic unsaturation in the polymer to be epoxidized, although an excess of hydrogen peroxide can be used if desired.

The temperature for carrying out the epoxidation reaction can vary substantially depending upon the specific materials being treated as well as specific acids being used, but the temperature is sufficient to cause epoxidation without the substantial formation of gel. Generally, the temperature for the reaction will be sufficiently elevated to cause the defined reaction but ordinarily will be in the range of from about −10° C. to about 120° C.

The concentration of the polymer solution is limited only by practical considerations such as ease of handling of the viscous solution. In general, for polymers having a high molecular weight, it is preferable to work with solutions containing from about 3 to about 20 weight percent polymer concentration, while for polymers having a low molecular weight, solutions of polymers of up to 80 weight percent or higher polymer concentration can be used.

The time of the epoxidation reaction is normally about 15 minutes to about four hours or longer, and depends on the concentration of the epoxidation recipe ingredients, the reaction temperature, the polymer composition, and the extent of epoxidation desired.

At the completion of the epoxidation step, the epoxidized polymer can be isolated by typical methods such as coagulation and steam stripping. However, it may be desirable or advantageous to first destroy the residual epoxidation reagents by known means, such as by heating in an alkaline medium and by addition of reducing agents or peroxide decomposition catalysts.

EXAMPLE I

Preparation of Styrene-Butadiene-Styrene Block Copolymer

Polymerizations were carried out employing essentially anhydrous reagents and conditions under an inert atmosphere (nitrogen) in 32-oz. beverage bottles equipped with a perforated crown cap over a self-sealing rubber gasket. Ingredients were charged and the polymerizations conducted at the conditions stipulated in Recipe 1.

| RECIPE 1 | |
|---|---|
| Step I | Polymer A |
| Cyclohexane, parts by weight | 780 |
| Sec-Butyllithium, mehm[a] | 1.0 |
| Styrene, parts by weight | 20 |
| Polymerization time, minutes[b] | 5,30 |
| Polymerization temperature, °C[b] | 50,70 |
| Step II | |
| Butadiene, parts by weight | 60 |
| Polymerization time, minutes | 45 |
| Polymerization temperature, °C | 70 |
| Step III | |
| Styrene, parts by weight | 20 |
| Polymerization time, minutes | 30 |

| -continued |   |
| --- | --- |
| RECIPE 1 | |
| Polymerization temperature, °C | 70 |

(a) Milliequivalents per 100 grams of total monomers added in all steps of recipe.
(b) 5 minutes at 50° C followed by 30 minutes at 70° C.

Following the completion of Step III, 2,4-di-t-butyl-4-methylphenol (one part by weight per hundred parts of total monomers) was added as a 10 weight percent solution in 50/50 (by volume) toluene/isopropyl alcohol, and the polymer recovered by adding the polymerization mixture to isopropyl alcohol. The coagulated polymer was collected by filtration and dried under reduced pressure. Physical properties of the butadiene/styrene teleblock polymer prepared by this procedure are shown in Table I.

TABLE I

| Physical Properties of Styrene-Butadiene-Styrene (20-60-20) Block Copolymer | |
| --- | --- |
| Inherent Viscosity | 0.99 |
| Molecular Weight, $M_w$ | 121,000 |
| Molecular Weight, $M_n$ | 107,000 |
| Gel, Weight Percent | 0 |

EXAMPLE II

Epoxidation of Butadiene/Styrene Teleblock Copolymer with Formic Acid and with a Mixture of Formic Acid and Acetic Acid Epoxidation was conducted according to the recipes given in Table II.

TABLE II

| Recipes for Epoxidation of Butadiene/Styrene Teleblock Copolymer | | |
| --- | --- | --- |
| | Epoxidized Polymer Identification | |
| | B | C |
| Polymer A(a), parts by weight | 100 | 100 |
| Cyclohexane, parts by weight | 780 | 780 |
| 97% Formic Acid, parts by weight | 33 | 16 |
| Glacial Acetic Acid, parts by weight | — | 18 |
| 30% Hydrogen Peroxide, parts by weight | 70 | 70 |
| Reaction time, hours | 2 | 2 |
| Reaction temperature, °C | 70 | 70 |

(a) Butadiene/styrene teleblock copolymer prepared in Example I.

The appropriate acid(s) was added to a stirred solution of the polymer in cyclohexane at 70° C. Hydrogen peroxide was then added dropwise with continued stirring over a period of 10 to 15 minutes. This mixture was stirred and maintained at 70° C. for two hours. The epoxidized polymer was coagulated in isopropyl alcohol and purified by recoagulating one or more times in isopropyl alcohol from toluene solution. Prior to the final coagulation, 2,6-di-t-butyl-4-methylphenol (one part by weight per hundred parts of total monomers) was added as a 10 weight percent solution in 50/50 (by volume) toluene/isopropyl alcohol. The coagulated polymer was dried under reduced pressure at 60° C. Table III tabulates the properties of the epoxidized polymers prepared by this procedure.

TABLE III

| Properties of Epoxidized Butadiene/Styrene Teleblock Copolymers | | |
| --- | --- | --- |
| | Epoxidized Polymer | |
| | B | C |
| Inherent Viscosity | (a) | 1.01 |
| Molecular Weight, $M_w$ | (a) | 134,000 |
| Molecular Weight, $M_n$ | (a) | 117,000 |
| Gel, Weight Percent | 90 | 0 |
| Oxirane Oxygen, Weight Percent | (a) | 5.04 |
| Total Oxygen, Weight Percent | (a) | 8.06 |

(a) Could not be determined due to only partial solubility (presence of gel particles).

Whereas epoxidation using formic acid as the sole acid resulted in polymer which was too insoluble for analysis (polymer B), epoxidation using a mixture of formic and acetic acids at a molar ratio of about 1:1 produced gel-free polymer (polymer C) which was readily soluble in the analysis solvents.

Epoxidized polymers B and C were evaluated for their molding properties. Epoxidized polymer B could be molded only once, attempted remolding resulting in an intractable mass. In contrast, epoxidized polymer C was remolded four times without the appearance of gel or indication of crosslinking.

Reducing the amounts of formic acid and hydrogen peroxide in the recipe for polymer B by about 20 percent resulted in polymer containing about 25–30 percent gel. The molding properties of this polymer were similar to those of the earlier epoxidized polymer prepared using formic acid alone (polymer B), remolding resulting in the formation of an intractable mass.

EXAMPLE III

Epoxidation of Linear Styrene-Butadiene Tapered Teleblock Copolymer with Formic Acid and with Formic Acid/Acetic Acid Mixtures A styrene-butadiene (49/51) linear, tapered teleblock copolymer (styrene-butadiene/styrene-styrene) having a number average molecular weight of 60,000 and having 39.4 percent block styrene was prepared by conventional procedures analogous to the method described in Example I. Epoxidation was conducted using formic acid as the only acid and using three different formic/acetic acid molar ratios according to the recipes given in Table IV.

TABLE IV

| Recipes for Epoxidation of Styrene-Butadiene Linear, Tapered Teleblock Copolymer with Formic/Acetic Acid Mixtures | | | | |
| --- | --- | --- | --- | --- |
| | Epoxidized Polymer Identificaton | | | |
| | D | E | F | G |
| Tapered Teleblock Copolymer parts by weight | 100 | 100 | 100 | 100 |
| Cyclohexane, parts by weight | 780 | 780 | 780 | 780 |
| 88% Formic Acid, parts by weight | 36 | 24 | 18 | 12 |
| Glacial Acetic Acid, parts by weight | — | 12 | 18 | 24 |
| 30% Hydrogen Peroxide, parts by weight | 70 | 70 | 70 | 70 |
| Reaction Time, hours | 2 | 2 | 2 | 2 |
| Reaction Temperature, °C | 70 | 70 | 70 | 70 |

Physical properties of the epoxidized polymers as shown in Table V clearly demonstrate the advantage, namely, the absence of gel formation, of the mixture of acids for epoxidizing of elastomers.

TABLE V

| Properties of Styrene-Butadiene Linear, Tapered Teleblock Copolymers Epoxidized with Mixtures of Formic and Acetic Acids | | | | |
| --- | --- | --- | --- | --- |
| | Epoxidized Polymers | | | |
| | D | E | F | G |
| Formic Acid/Acetic Acid, | | | | |

TABLE V-continued

Properties of Styrene-Butadiene Linear, Tapered Teleblock Copolymers Epoxidized with Mixtures of Formic and Acetic Acids

|  | Epoxidized Polymers | | | |
|---|---|---|---|---|
|  | D | E | F | G |
| molar ratio | 1:0 | 2:1 | 1:1 | 1:2 |
| Inherent Viscosity | (a) | 1.07 | 0.66 | 0.63 |
| Molecular Weight, $M_w$ | (a) | (b) | 90,000 | 67,000 |
| Molecular Weight, $M_n$ | (a) | (b) | 65,000 | 43,000 |
| Gel, Weight Percent | 89 | 0 | 0 | 0 |
| Oxirane Oxygen, Weight % | (a) | 4.6 | 4.5 | 3.8 |
| Total Oxygen, Weight % | (a) | 10.4 | 8.7 | 7.5 |

(a) Could not be determined due to only partial solubility (presence of gel particles).
(b) CGC showed a bimodal curve, an indication that crosslinking had occurred and that gelling was imminent.

EXAMPLE IV

Epoxidation of Linear Styrene-Butadiene Tapered Teleblock Copolymer with Formic Acid/Propionic Acid Mixtures A styrene-butadiene linear, tapered teleblock copolymer having a number average molecular weight of 71,000 was prepared by conventional procedures analogous to the method described in Example I. Epoxidation was conducted using four different molar ratios of formic/propionic acids according to the recipes given in Table VI.

TABLE VI

Recipes for Epoxidation of Styrene-Butadiene Linear, Tapered Teleblock Copolymer with Formic/Propionic Acid Mixtures

|  | Epoxidized Polymer Identification | | | |
|---|---|---|---|---|
|  | H | I | J | K |
| Tapered Teleblock Copolymer, parts by weight | 100 | 100 | 100 | 100 |
| Cyclohexane, parts by weight | 800 | 800 | 800 | 800 |
| 97% Formic Acid, parts by weight | 20 | 15 | 10 | 7 |
| Propionic Acid, parts by weight | 16 | 24 | 32 | 36 |
| 30% Hydrogen Peroxide, parts by wt. | 70 | 70 | 70 | 70 |
| Reaction Time, hours | 2 | 2 | 2 | 2 |
| Reaction Temperature, °C | 70 | 70 | 70 | 70 |

Properties of the epoxidized polymers as shown in Table VII demonstrate that although gel is formed at a 2:1 formic acid/propionic acid molar ratio, increasing the relative molar level of propionic acid eliminates the gel problem resulting in epoxidized polymer having good physical properties.

TABLE VII

Properties of Styrene-Butadiene Linear, Tapered Teleblock Copolymers Epoxidized with Mixtures of Formic and Propionic Acids

|  | Epoxidized Polymers | | | |
|---|---|---|---|---|
|  | H | I | J | K |
| Formic acid/propionic acid Molar Ratio | 2:1 | 1:1 | 1:2 | 1:3 |
| Inherent Viscosity | 0.75 (a) | 0.76 | 0.76 | 0.94 |
| Molecular Weight, $M_w$ | (b) | 181,000 | 94,000 | 73,000 |
| Molecular Weight, $M_n$ | (b) | 94,000 | 71,000 | 56,000 |
| Gel, Weight Percent | 66 | 0 | 0 | 0 |
| Oxirane Oxygen, Weight Percent | (b) | 4.7 | 3.6 | 2.8 |
| Total Oxygen, Weight Percent | (b) | 8.3 | 6.6 | 5.7 |

(a) Soluble portion of polymer.
(b) Could not be determined due to only partial solubility (presence of gel particles in evaluating solvents).

Epoxidized polymers I, J, and K were molded and remolded a total of four times without evidence of crosslinking or gelling. Epoxidized polymer H could be molded only once and then only with difficulty.

EXAMPLE V

Epoxidation of Styrene-Butadiene Radial Teleblock Copolymers

Divinylbenzene coupled butadiene-styrene (60/40 and 70/30) teleblock copolymers were prepared using conventional methods. Epoxidation was effected using a 1:1 weight ratio of formic/acetic acids using the epoxidation recipe given for polymer F in Table IV. Properties of the epoxidized and unepoxidized polymers are given in Table VIII.

TABLE VIII

Physical Properties of Epoxidized and Unepoxidized Radial Teleblock Polymers

|  | Polymer Identification | | | |
|---|---|---|---|---|
|  | L | M | N | O |
| Butadiene/Styrene, Wt. % | 60/40 | 60/40 | 70/30 | 70/30 |
| Molecular Weight, $M_w$ | 165,000 | 179,000 | 158,000 | 176,000 |
| Molecular Weight, $M_n$ | 118,000 | 127,000 | 114,000 | 127,000 |
| Total Oxygen, Weight % | 0 | 7.8 | 0 | 8.1 |
| Tensile (23° C), megapascals[a] | 26.5 | 31.5 | 25.4 | 25.8 |
| Elongation (23° C), Percent[a] | 690 | 670 | 780 | 790 |
| 300% Modulus, megapascals[a] | 4.5 | 4.2 | 3.0 | 2.0 |
| Hardness, Shore A[b] | 89 | 86 | 73 | 63 |

[a] ASTM D412-75.
[b] ASTM D2240-75.

These data demonstrate that epoxidation using a 1:1 molar ratio of formic/acetic acids does not adversely affect the tensile properties of the radial teleblock polymers. Gel permeation chromatography curves of epoxidized and unepoxidized polymers were essentially identical, indicating that no gel formation occurred during epoxidation.

Epoxidized and unepoxidized radial teleblock polymers L, M, N, and O were evaluated for oil resistance with the results as tabulated in Table IX.

TABLE IX

Oil Resistance[a] of Epoxidized Radial Teleblock Polymers

|  | Polymer Identification | | | |
|---|---|---|---|---|
|  | L | M | N | O |
| Aged 7 Days in ASTM Oil #3 at Room Temperature | | | | |
| Tensile (23° C), megapascals | (b) | 18.9 | (b) | 0.5 |
| Elongation (23° C), percent | (b) | 760 | (b) | 1150 |
| % Swell after 7 Days in Oil at Room Temperature | | | | |
| ASTM Oil #1 | 11.6 | 1.5 | 26.2 | 3.0 |
| ASTM Oil #2 | 19.3 | 4.4 | 42.9 | 8.7 |
| ASTM Oil #3 | 184.2 | 21.6 | 223.6 | 39.7 |
| Reference Fuel A | 235.8 | 29.0 | 312.1 | 35.4 |
| Reference Fuel B | (b) | (b) | (b) | (b) |

(a) ASTM D471-75.
(b) Polymer, dissolved.

The data in Table IX demonstrate that the radial teleblock polymers epoxidized using a mixture of formic/acetic acids have considerably more resistance to various oils than does the unepoxidized polymer.

The following analytical procedures are applicable to the data tabulated in the tables of the preceding examples.

Inherent Viscosity:

One-tenth gram of polymer was placed in a wire cage made from 80-mesh screen and the cage placed in 100 ml of toluene contained in a wide-mouth, 4-ounce bottle. After standing at room temperature (approximately 77° F.) for 24 hours, the cage was removed and a sample of the solution filtered through a fritted glass filtering stick of C porosity and pressured directly into the viscometer. The resulting solution was run through a Medalia-type viscometer supported in a 77° F. bath. The viscometer was previously calibrated with toluene. The relative viscosity is the ratio of the polymer solution to that of toluene. The inherent viscosity is calculated by dividing the natural logarithm of the relative viscosity by the weight of the soluble portion of the original sample.

Molecular Weight, $M_w$ and $M_n$:

Determined using a gel permeation chromatography method as described by Gerard Kraus and C. J. Stacy, J. Poly Sci.: Symposium No. 43, 329–343 (1973).

Gel, Weight Percent:

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

Oxirane Oxygen, Weight Percent:

Weight in grams of oxirane oxygen per 100 grams of epoxidized polymer was determined by procedure described in R. R. Jay, Anal. Chem. 36, 667–668 (1964).

Total Oxygen, Weight Percent:

Weight in grams of oxygen per 100 grams of epoxidized polymer as determined by activation analysis.

I claim:

1. A process for the production of epoxidized polymers substantially free of gel which comprises contacting:
   (a) a rubbery polymer of a conjugated diene in
   (b) an aliphatic or alicyclic hydrocarbon diluent capable of dissolving said rubbery polymer with
   (c) hydrogen peroxide and
   (d) a mixture of formic acid and at least one other low molecular weight monocarboxylic acid under epoxidation conditions which produce substantially gel-free epoxidized rubbery polymers of conjugated diene.

2. A process according to claim 1 wherein the ratio (molar) of formic acid to said other acid ranges from about 3:2 to about 1:10 and said other acid has from 2 to 9, inclusive, carbon atoms per molecule.

3. A process according to claim 1 wherein said diluent has a boiling point in the range of about 35° to about 150° C., the amount of hydrogen peroxide ranges from about 1 to about 2 moles per mole of olefinic unsaturation in the polymer to be epoxidized, and the temperature during epoxidation is in the range of about −10° C. to about 120° C.

4. A process according to claim 1 wherein said rubbery polymer is selected from homopolymers of conjugated dienes having from 4 to 12, inclusive, carbon atoms and copolymers of said conjugated dienes and monovinylarenes having from 8 to 20, inclusive, carbon atoms, and wherein said polymers have a number average molecular weight in the range of about 5,000 to about 400,000.

5. A process according to claim 1 wherein (a) is a rubbery polymer selected from homopolymers of conjugated dienes having from 4 to 12 carbon atoms and copolymers of said conjugated dienes and monovinylarenes having from 8 to 20 carbon atoms, (b) is a hydrocarbon diluent having a boiling point ranging from about 35° C. to about 150° C., (c) the amount of hydrogen peroxide present ranges from about 1 to about 2 moles per mole of olefinic unsaturation in the polymer to be epoxidized, (d) the molar ratio of formic acid to said other acid ranges from about 3:2 to about 1:10, and further wherein the temperature of said contacting is in the range of about −10° C. to about 120° C.

6. A process according to claim 1 wherein (a) is a styrene-butadiene-styrene (20-60-20) block copolymer, (b) is cyclohexane, and (d) is a mixture of formic acid and acetic acid.

7. A process according to claim 1 wherein (a) is a linear styrene-butadiene tapered teleblock copolymer, (b) is cyclohexane, and (d) is a mixture of formic acid and acetic acid.

8. A process according to claim 1 wherein (a) is a linear styrene-butadiene tapered teleblock copolymer, (b) is cyclohexane, and (d) is a mixture of formic acid and propionic acid.

9. A process according to claim 1 wherein (a) is a divinylbenzene coupled butadiene-styrene (60-70/40-30) teleblock copolymer, (b) is cyclohexane, and (d) is a mixture of formic and acetic acids.

* * * * *